United States Patent Office 3,268,597
Patented August 23, 1966

3,268,597
CONTINUOUS PREPARATION OF 2,3-DIBROMO-PROPANOL-1 COMPOUND
Carl W. Clemons and Donald E. Overbeek, St. Louis, Mich., assignors to Michigan Chemical Corporation, St. Louis, Mich., a corporation of Michigan
No Drawing. Filed Aug. 3, 1962, Ser. No. 214,493
2 Claims. (Cl. 260—633)

This invention relates to a process for continuously preparing commercial quantities of 2,3-dibromo-1-propanol.

In the preparation of 2,3-dibromo-1-propanol, allyl alcohol is reacted with bromine. This general reaction is utilized in this invention as well as in the prior art processes for the preparation of 2,3-dibromo-1-propanol.

All of the known prior art processes for the preparation of 2,3-dibromo-1-propanol are conducted as batch reactions. Thus, a commonly used method is to introduce stoichiometric amounts of allyl alcohol and bromine into a large batch reactor and allow the reaction to go to completion. There are a number of disadvantages inherent in such batch reactions.

The first and most serious disadvantage of the batch reaction is that considerable quantities of 1,2,3-tribromopropane are formed in the reaction. Thus, anywhere from 10 to 15 percent or more by weight of the reaction product is 1,2,3-tribromopropane. This compound has a boiling point between 219°–221° C. The 2,3-dibromo-1-propanol has a boiling point of 219° C. Thus, when these two compounds are in a reaction mixture, their separation is virtually impossible by conventional means such as distillation. To separate these compounds by other than conventional means results in a product that is extremely expensive. The resulting impure brominated product does not meet specifications for its end use because of the presence of large amounts of 1,2,3-tribromopropane. Thus, this prior art batch process has been found to be unacceptable as a method of the preparation of 2,3-dibromo-1-propanol.

A further problem encountered in large batch reactions for the preparation of 2,3-dibromo-1-propanol is that there is a high initial equipment cost. Large batch reactors are very expensive and this is particularly true where they are glass-lined as is the case with this reaction. Further, large batch reactors have a considerable down time because of the need for emptying and recharging. Further still, because of the large mass of reactants in the batch reactor, heat transfer required for cooling the reaction mass is very difficult and expensive to carry out.

A newer type of batch reaction used by the prior art is to conduct the reaction of the allyl alcohol and bromine in the presence of an organic solvent. While yields are slightly higher than in conventional batch methods and the 1,2,3-tribromopropane production is reduced somewhat, reactor sizes and material costs are increased to the point where the resulting product is not economically competitive. Further, separation means such as distillation columns for removing the organic solvent must be larger and more costly. Labor costs are increased because of the greater material handling problem.

Because of the disadvantages found in the prior art batch processes, there is a need for an economical and simplified process for the preparation of the 2,3-dibromo-1-propanol.

It is therefore an object of this invention to provide a process for continuously preparing 2,3-dibromo-1-propanol, thereby eliminating the down time found in batch reaction processes.

It is further an object of this invention to provide a continuous process which is simple and thus economic from the viewpoint of equipment, material and labor costs.

It is further an object of this invention to provide a continuous process which has improved yields of the 2,3-dibromo-1-propanol.

It is further an object of this invention to provide a continuous process which greatly reduces the amount of the compound 1,2,3-tribromopropane formed with 2,3-dibromo-1-propanol, thus providing a product which meets specifications.

Still further, it is an object of this invention to eliminate the need for an organic solvent in order to improve yields, thereby markedly reducing material and labor costs.

These and other objects will be come increasingly apparent to those skilled in the art as the description proceeds.

It has been found that commercial quantities of 2,3-dibromo-1-propanol can be prepared by the continuous process of this invention which comprises the continuous reaction of allyl alcohol with bromine in the presence of 2,3-dibromo-1-propanol and the continuous removal of the reaction product, 2,3-dibromo-1-propanol. It has further been found that the desired 2,3-dibromo-1-propanol can be easily removed from the crude product by conventional separation means.

The chemical reaction for the production of 2,3-dibromo-1-propanol is as follows:

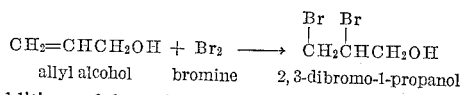

allyl alcohol    bromine    2,3-dibromo-1-propanol

The addition of bromine to allyl alcohol is very rapid even in the presence of the organic solvents used by the prior art. Because of this, it might be predicted that the yields of 2,3-dibromo-1-propanol would be essentially 100%. However, in practice it has been found in batch reactions that large amounts of 1,2,3-tribromopropane are formed as a result of a competing side reaction with the allyl alcohol. After considerable study, the mechanism of this side reaction was determined to be as follows:

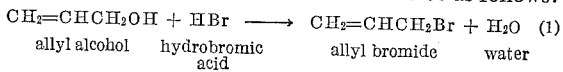

allyl alcohol    hydrobromic acid    allyl bromide    water

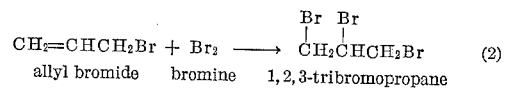

allyl bromide    bromine    1,2,3-tribromopropane

It was observed that hydrogen bromide was being produced by some minor side-reaction during the bromination of allyl alcohol, even when an especially dried allyl alcohol was used. It was known that allyl alcohol reacted quite rapidly with hydrogen bromide even in the absence of a dehydrating agent to form allyl bromide and water (1). The reaction of water produced by (1) with bromine could result in further formation of hydrogen bromide in addition to that being formed by the first side-reaction cited. Allyl bromide was known to add bromine quantitatively to form 1,2,3-tribromopropane (2) which is reported to having a boiling point between 219°–221° C., which is in the same range as that of 2,3-dibromo-1-propanol at 219° C. Authentic 1,2,3-tribromopropane was prepared and was shown to have the same retention time on a gas chromatographic column as the impurity in 2,3-dibromo-1-propanol from a batch reaction. From this it was concluded that the impurity in 2,3-dibromo-1-propanol was 1,2,3-tribromopropane and infrared absorption spectra study confirmed this fact.

In addition, it was demonstrated that 1,2,3-tribromopropane was not produced when 2,3-dibromo-1-propanol was saturated with anhydrous hydrogen bromide and allowed to stand at room temperature for five days.

On one occasion 5 moles of 2,3-dibromo-1-propanol was prepared by the addition of 5 moles of bromine to 5 moles of allyl alcohol dissolved in an equal volume of chloroform acting as an organic solvent. The solvent was then removed by distillation under reduced pressure. Infrared absorption spectrum studies of the crude product from this batch reaction did not show any of the absorption bands characteristic of 1,2,3-tribromopropane. Subsequently, several ½ mole reactions were carried out using carbon tetrachloride and benzene as solvents. No 1,2,3-tribromopropane was found to be present in the crude or distilled product. It was tentatively concluded that 1,2,3-tribromopropane was not formed in the presence of the organic solvents. However, it was subsequently discovered that it was the small concentration of the reactants in the solvent that was responsible for this result.

It was then found that in the small batch reactions without organic solvents, there was no opportunity for the allyl alcohol to react with hydrogen bromide. However, as the size of the batch increased above about 5 moles of each of the reactants or if the bromination was done at a slow rate, a considerable amount of 1,2,3-tribromopropane was formed. It thus became apparent that the competing side reaction depended upon the bromination time and the amount and concentration of the reactants. It was these observations that led to the continuous process of this invention.

Having thus deduced the method of formation of 1,2,3-tribromopropane and having observed that the amounts formed when an organic solvent was used in a batch reaction were somewhat decreased, the discovery was made that by the addition of bromine and liquid allyl alcohol to a quantity of the compound 2,3-dibromo-1-propanol, as a heel, a highly efficient and economical process resulted. By this means, the concentration of the unreacted allyl alcohol was kept low by dilution in the heel of 2,3-dibromo-1-propanol. Further, the rate of reaction of allyl alcohol with hydrogen bromide to form allyl bromide (1) was greatly reduced because of its dependence upon the concentration of allyl alcohol. The bromination step was found not to be slowed by this dilution method. As a result, the concentration of 1,2,3,-tribromopropane formed in the competing side reaction was very greatly reduced. It was further found that the reaction vessel could be very small, since it was now possible to produce the product continuously. Further still, it was found that heat transfer problems were very materially reduced because of the decreased size of the reaction vessel. Also, it was found that markedly improved yields of 2,3-dibromo-1-propanol resulted. These were greater than were expected from the decrease in the amount of the contaminant 1,2,3-tribromopropane formed.

The following examples are given by way of illustration of the continuous process of this invention.

EXAMPLE 1

By way of illustration of a bench scale experiment for the production of 2,3-dibromo-1-propanol the following example is given.

The equipment for the following process was as follows: a one liter, four neck flask, stirrer, two stoppered dropping funnels, thermometer and dip tube. The stirrer, dropping funnels, thermometer and dip tube were mounted on the flask and each of its four openings. A cooling jacket was provided such that the temperature was maintained at 25°–30° C. in the flask.

Crude 2,3-dibromo-1-propanol (one half liter) containing 3.1% by weight 1,2,3-tribromopropane, 85% by weight of 2,3-dibromo-1-propanol and an organic residue of 11.9% was introduced into the flask. Throughout the process, the temperature in the flask was maintained at 25–30° C. by means of the cooling jacket. Allyl alcohol (290 grams, 5 moles) was introduced into one of the closed dropping funnels and elemental bromine (800 grams, 5 moles) into the other closed dropping funnel.

The reactants, allyl alcohol and elemental bromine, were introduced into the flask such that the amount of reactants in the flask was maintained as close as possible to a 1:1 molar ratio. The addition time was about 50 minutes.

The crude product containing the 2,3-dibromo-1-propanol was removed from the flask continuously by means of a dip tube to a total of 5 moles and then analyzed (heel). Four further runs (A, B, C and D) were made repeating the above procedure. The results of these runs are tabulated in Table I.

*Table I*

| Run | 2,3-dibromo-1-propanol (percent by weight) | 1,2,3-tribromopropane (percent by weight) |
|---|---|---|
| (Heel) | 85.0 | 3.1 |
| A | 87.0 | 2.2 |
| B | 89.3 | 1.5 |
| C | 91.5 | <1 |
| D | 90.0 | <1 |

It can thus be seen from the Table I that the amount of the desired 2,3-dibromo-1-propanol in the reaction product steadily increased and that the amount of the undesired 1,2,3-tribromopropane in the end product steadily decreased.

Thus, each time the material in the flask was continuously upgraded by virtue of the new formation of 2,3-dibromo-1-propanol. It can further be seen from this bench scale process that very high yields of 2,3-bromo-1-propanol resulted and that there is a very small amount of 1,2,3-tribromopropane present as contaminant in the final product mass.

It further can be seen that a continuous process can be conducted. This method formed the basis for the production runs shown in the Example II.

EXAMPLE II

Example II is one example of a run for the production of 2,3-dibromo-1-propanol. The results of similar runs are tabulated in Tables II, III and IV.

In this process (see run #20), bromine was pumped by means of a metering pump to a 100 gallon agitated reactor containing a heel (50 gallons) of 2,3-dibromo-1-propanol. The bromine was introduced into the reactor. Simultaneously with the addition of the bromine, allyl alcohol (commercial grade) was pumped from a weigh tank mounted on weighing scales into the 100 gallon reactor. The allyl alcohol was pumped by means of a metering pump. The allyl alcohol pump was adjusted and the bromine pump was adjusted such that the weight ratio of bromine to allyl alcohol was 2.5. The reactor was cooled by means of circulating brine in a jacket on the outside of the reactor. By means of this cooling jacket, the reaction temperature was maintained below 60° C. The crude 2,3-dibromo-1-propanol formed in the reaction was allowed to continuously flow out of a bottom outlet of the reactor and overflow through a liquid level control leg into a receiver.

The crude 2,3-dibromo-1-propanol was then pumped batch-wise to a reactor where it was preheated to 90° C. The heated crude material was then introduced into a still. The still pressure was reduced and the forerun from a previous distillation introduced into the still. The amount of crude to be preheated and charged to the still was determined by the amount of forerun recovered from the previous batch. A forerun was taken under reduced pressure for a period of 30 minutes after the pot temperature and head temperature curves became parallel. The forerun was collected. After the forerun was completed, the product was collected in receivers until the product ceased to distill over or became colored. The product was then analyzed. The results were tabulated in Tables II and III (run number 20).

The general procedure of Example II was repeated for numerous runs at various weight ratios of bromine to allyl alcohol. The results of these runs and the analyses of the distilled product are contained in Tables II and III.

*Table II.—Distilled dibromopropanol analyses*

| Run | Bromine/allyl Alcohol Ratio, lb./lb. | Percent Water | Percent Tribromopropane | Percent Dibromopropanol |
|---|---|---|---|---|
| 1 | 2.76 | 0.258 | 4.6 | 96.80 |
| 2 | 2.76 | 0.198 | 2.0 | 97.75 |
| 3 | 2.76 | 0.880 | 5.0 | 94.80 |
| 4 | 2.76 | 0.190 | 2.3 | 96.80 |
| 5 | 2.76 | 0.270 | 2.4 | 97.60 |
| 6 | 2.76 | 0.240 | 1.0 | 98.00 |
| 7 | 2.76 | 0.190 | 2.7 | 96.70 |
| 8 | 2.76 | 0.250 | 3.2 | 96.00 |
| 9 | 2.60 | 0.180 | 2.3 | 96.00 |
| 10 | 2.60 | 0.190 | 3.9 | 95.80 |
| 11 | 2.60 | 0.263 | 1.3 | 98.00 |
| 12 | 2.60 | 0.198 | 1.5 | 98.00 |
| 13 | 2.60 | 0.248 | 0.9 | 99.00 |
| 14 | 2.40 | 0.090 | 4.5 | 95.70 |
| 15 | 2.40 | 0.168 | 5.9 | 95.10 |
| 16 | 2.40 | 0.074 | 5.7 | 94.40 |
| 17 | 2.40 | 0.095 | 5.1 | 94.30 |
| 18 | 2.40 | 0.165 | 7.0 | 95.20 |
| 19 | 2.40 | 0.080 | 6.7 | 96.20 |
| 20 | 2.50 | 0.260 | 3.5 | 97.80 |
| 21 | 2.50 | 0.028 | 3.5 | 98.50 |
| 22 | 2.50 | 0.155 | 3.0 | 97.70 |
| 23 | 2.60 | 0.225 | 2.9 | 96.00 |
| 24 | 2.60 | 0.240 | 2.5 | 97.80 |
| 25 | 2.60 | 0.300 | 1.8 | 97.10 |
| 26 | 2.60 | 0.280 | 1.6 | 97.00 |
| 27 | 2.60 | 0.120 | 2.1 | 96.70 |

*Table III.—Efficiencies on dibromopropanol distillations*

| Run | Bromine/allyl Alcohol Ratio, lb./lb. | Cumulative Percent yield aft distillation (weight basis) | |
|---|---|---|---|
| 1 | 2.76 | 65.4 | |
| 2 | 2.76 | 68.1 | |
| 3 | 2.76 | 68.3 | |
| 4 | 2.76 | 70.6 | |
| 5 | 2.76 | 71.3 | |
| 6 | 2.68 | 72.9 | |
| 7 | 2.68 | 74.7 | Forerun discarded. |
| 8 | 2.68 | 75.9 | |
| 9 | 2.60 | 76.0 | |
| 10 | 2.60 | 76.8 | |
| 11 | 2.60 | 78.0 | |
| 12 | 2.60 | 78.3 | |
| 13 | 2.60 | 79.2 | |
| 14 | 2.40 | 80.2 | |
| 15 | 2.40 | 81.7 | |
| 16 | 2.40 | 81.9 | |
| 17 | 2.40 | 82.2 | |
| 18 | 2.40 | 83.2 | |
| 19 | 2.40 | 83.4 | |
| 20 | 2.50 | 83.6 | Forerun from previous run added back. |
| 21 | 2.50 | 83.7 | |
| 22 | 2.50 | 84.0 | |
| 23 | 2.60 | 83.7 | |
| 24 | 2.60 | 83.7 | |
| 25 | 2.60 | 83.6 | |
| 26 | 2.60 | 83.3 | |
| 27 | 2.60 | 83.3 | |

In all runs the bromine and allyl alcohol were added continuously to the reaction vessel. In most instances these reactants were added simultaneously and this is the preferred method. It was found that the continuous process operated at peak efficiency when the reactants were added simultaneously.

During the early runs, equipment had not yet been set up for recovery of forerun from the dibromopropanol distillation. During this period, therefore, the foreruns were retained and after equipment installation was completed, they were gradually worked back into the system (see Table III). Recovery of forerun was initiated on run 10. Starting with run 15, forerun was routinely recovered and "added back" to the next batch. The method of recovery was to transfer the forerun to an open top receiver containing 10-15 gallons of deionized water. A mixer mounted in this receiver supplied agitation. Transfer was made by applying air pressure to the forerun receiver. After agitating for about 10-15 minutes, the layers were allowed to separate, and the bottom dibromopropanol layer was drawn off and collected in suitable vessels from which it was charged back to the next still load.

The early runs (1-14) in Table III indicate a lower distillation efficiency than was actually present. Later runs with results comparable to those shown in Table III demonstrate that very high efficiencies are obtained when the bromine to allyl alcohol weight ratio is maintained at between about 2.65 and about 2.76 which is the preferred range. The yields for these later runs at various bromine to allyl alcohol ratios are given in Table IV.

*Table IV*

| Run | Bromine, lb./lb., Allyl Alcohol | Percent yield after distillation (weight basis) |
|---|---|---|
| 28 | 2.73 | 79.5 |
| 29 | 2.69 | 79.0 |
| 30 | 27.3 | 77.1 |
| 31 | 2.67 | 86.0 |

As can be seen from Tables III and IV, very high yields of the 2,3-dibromo-1-propanol were obtained. Further, very small amounts of 1,2,3-tribromopropane and water as contaminants were produced (Table II). It was demonstrated during various runs that a continuous process could be operated very economically to produce 2,3-dibromo-1-propanol. It was also found that temperature control during the reaction was greatly simplified because of the reduced amounts of material present in the reaction chamber.

By way of comparison with the above examples, comparative Example III is presented.

COMPARATIVE EXAMPLE III

A 750 gallon agitated reactor was charged with 3200 pounds of allyl alcohol (commercial grade). Bromine (8832 pounds) was added to the stirred allyl alcohol at such a rate that the temperature of the reaction mixture was maintained at 15° C. by brine cooling of the reaction vessel. Addition of the reactants required 19 hours.

Following completion of the bromination, the crude product was transferred to an agitated wash tank where it was agitated for 15 minutes with 200 gallons of water. The lower product layer was isolated and agitated with another 200 gallons of water. During the agitation aqueous ammonia was added until the pH of the mixture was 8-9. The lower organic layer was isolated and transferred back to the 750 gallon agitated reactor where it was distilled under reduced pressure. The 2,3-dibromo-1-propanol was collected at a vapor temperature of 118°-122° C. and 30 mm. pressure. Ninety-four hundred pounds of product was collected representing 78% by weight of the theoretical quantity. This product contained 10.3% by weight of 1,2,3-tribromopropane.

This batch reaction was conducted under ideal conditions for this type of reaction. The maximum yield that has been obtained was 78%. Numerous other reactions on the same scale were conducted with much poorer yields. Thus, yields on the order of 65-70% have been found to be average for the batch process.

However, the continuous process of this invention consistently produces yields of from about 78-86% as seen from Tables III and IV. Another benefit resulting from the continuous process is that the reactor size is greatly reduced. Thus, the reaction chamber can be as small as $\frac{1}{7}$ the volume of that utilized in batch reactions. Rates comparable to the batch process were obtained in pilot plant work in a vessel $\frac{1}{15}$ the size of the batch equipment. This represents a substantial savings in equipment cost.

A further unexpected result derived from the process of this invention is that the amount of the contaminating 1,2,3-tribromopropane is greatly reduced. Under the preferred operating conditions, the amount of 1,2,3-tribromopropane in the reaction product was reduced to less than about 2% by weight. This is significant when compared with the 10.3% or more by weight produced in the prior art batch processes. Thus, the product of this invention will meet consumer specifications while the product of the prior art batch process frequently will not.

Another benefit is that there is less equipment down time than in the case of batch reactor. This reduces production costs.

As can be seen from the Table II, the ratio of bromine to allyl alcohol has varied between about 2.4 and about 2.8 (see Table II). At the bromine to allyl alcohol ratio of 2.76 it was found that there was excessive off gassing of hydrobromic acid and bromine during the distillation of the crude product. When the bromine to allyl alcohol weight ratio was 2.4 it was found that there was a small increase in the amount of 1,2,3-tribromopropane produced in the reaction. At this weight ratio, the maximum amount of the 1,2,3-tribromopropane that was produced was seven percent (7%) by weight of the total distilled product (run 18). In most runs, it was found to be between four and five percent (4–5%). It was found that a weight ratio of between 2.65 and about 2.76 pounds of bromine per pound of allyl alcohol resulted in optimum operation of the continuous process.

A primary use for 2,3-dibromo-1-propanol is as an intermediate in the production of tris (2,3-dibromopropyl) phosphate, a useful flame-proofing agent. This reaction is as follows:

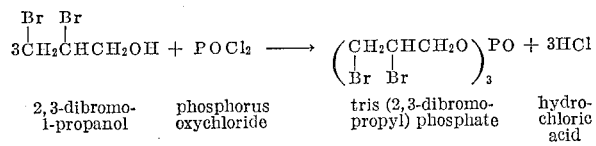

| 2,3-dibromo-1-propanol | phosphorus oxychloride | tris (2,3-dibromo-propyl) phosphate | hydrochloric acid |

The hydrochloric acid gas from the reaction is absorbed in a suitable material. Upon completion of the reaction, the crude tris (2,3-dibromopropyl) phosphate is treated with an equal volume of deionized water. Ammonium hydroxide is added to bring the pH of the water layer to 7.5. This layer is then decanted off. This washing removes residual hydrochloric acid plus any acidic phosphoric acid esters. If there is an excess of phosphorus oxychloride present in the reaction system, this will form an ammonium salt. This salt is washed out and thus lowers efficiencies and increases the cost of the final tris (2,3-dibromopropyl) phosphate.

Because of the continuous process of this invention, the 2,3-dibromo-1-propanol product has a uniformly high analysis. As a result, exact stoichiometric amounts of the phosphorus oxychloride can be added without frequent analysis of the intermediate 2,3-dibromo-1-propanol and without forming appreciable amounts of the undesirable ammonium salt. Since the tris (2,3-dibromopropyl) phosphate has been found valuable in flameproofing applications where it is combined with various resins, such as polystyrene, the continuous process of this invention has strong utility.

In addition, because of the reduction in the amount of 1,2,3-tribromopropane carried over in the 2,3-dibromo-1-propanol as a contaminant, the latter compound meets specifications for many of its applications whereas if it were produced by the batch processes, it would not. This is particularly critical when it is used in the production of tris (2,3-dibromopropyl) phosphate since the latter specifications frequently call for 5% or less of combined volatiles, such as 1,2,3-tribromopropane.

Further still, the continuous process of this invention provides an improved yield or reaction efficiency that is proportionately greater than that accounted for by the reduction of the amount of the undesired 1,2,3-tribromopropane.

As illustrated in Examples I and II, it is preferred that a heel of the 2,3-dibromo-1-propanol be present in the reactor at all times. It has been found that the effect of this heel is to dilute the allyl alcohol such that the hydrobromic acid side reaction, (1) and (2) above, is minimized but such that the bromination step to produce 2,3-dibromo-1-propanol is not materially retarded. Best results are obtained when the concentration of the allyl alcohol in the reactor at any given time is less than 50% of the combined weight of the allyl alcohol and heel in the reactor. However, any appreciable amount of 2,3-dibromo-1-propanol as a heel yields enhanced results when compared to the prior art batch processes.

While the foregoing is a specific description of the process of this invention, it is intended that it be limited only by the hereinafter appended claims.

We claim:
1. The process for continuously preparing 2,3-dibromo-1-propanol which consists of:
   (a) the continuous, simultaneous addition of liquid allyl alcohol and bromine to a reaction chamber containing liquid 2,3-dibromo-1-propanol while maintaining the bromine to allyl alcohol weight ratio between about 2.4 and about 2.8, while maintaining a temperature in the reaction chamber at less than about 60° C. and while maintaining the weight ratio of allyl alcohol in the reaction chamber at any one time at less than fifty percent of the combined weight of allyl alcohol and 2,3-dibromo-1-propanol, the said bromine being introduced below the liquid surface of the 2,3-dibromo-1-propanol in the reaction chamber; and
   (b) the continuous removal of the liquid reaction product containing substantially 2,3-dibromo-1-propanol from the reaction chamber.
2. The process of claim 1 wherein the separation is by continuous distillation.

References Cited by the Examiner

UNITED STATES PATENTS 3,092,669   6/1963   Denton et al. _____ 260—633

FOREIGN PATENTS 1,089,743   9/1960   Germany.

OTHER REFERENCES

Groggins: "Unit Proc. in Org. Syn.," fifth ed., 1958, pp. 258–9.

Tornoe Deutshe Chemische Gesellschaft, vol. 24 (1891), pp. 2670–2678.

LEON ZITVER, *Primary Examiner.*

HAROLD G. MOORE, *Examiner.*

M. B. ROBERTO, J. E. EVANS, *Assistant Examiners.*